(12) United States Patent
Gum

(10) Patent No.: US 7,027,832 B2
(45) Date of Patent: Apr. 11, 2006

(54) PROVIDING CUSTOM AUDIO PROFILE IN WIRELESS DEVICE

(75) Inventor: Arnold J. Gum, San Diego, CA (US)

(73) Assignee: Qualcomm Incorporated, San Diego, CA (US)

(*) Notice: Subject to any disclaimer, the term of this patent is extended or adjusted under 35 U.S.C. 154(b) by 284 days.

(21) Appl. No.: 09/996,524

(22) Filed: Nov. 28, 2001

(65) Prior Publication Data

US 2003/0100345 A1  May 29, 2003

(51) Int. Cl.
*H04M 1/00* (2006.01)
(52) U.S. Cl. .............. 455/550.1; 455/556.1; 455/556.2; 455/557; 455/563; 379/88.01
(58) Field of Classification Search ............ 455/550.1, 455/556.1, 556.2, 557, 563; 379/88.1, 201.11
See application file for complete search history.

(56) References Cited

U.S. PATENT DOCUMENTS

| | | | | |
|---|---|---|---|---|
| 4,241,235 A | * | 12/1980 | McCanney | 381/61 |
| 4,823,380 A | * | 4/1989 | Kohen et al. | 379/387.02 |
| 5,113,449 A | * | 5/1992 | Blanton et al. | 704/261 |
| 5,327,521 A | | 7/1994 | Savic et al. | |
| 5,668,868 A | * | 9/1997 | Nordenstrom | 379/447 |
| 5,822,404 A | * | 10/1998 | Cave | 379/88.13 |
| 6,115,465 A | * | 9/2000 | Hardy | 379/386 |
| 6,404,872 B1 | * | 6/2002 | Goldberg et al. | 379/201.11 |
| 6,510,208 B1 | * | 1/2003 | Komiya | 379/88.1 |
| 2001/0006901 A1 | | 7/2001 | Ryu | |

FOREIGN PATENT DOCUMENTS

| | | | |
|---|---|---|---|
| EP | 0918435 | | 5/1999 |
| GB | 2343822 | * | 5/2000 |
| JP | 11015498 | * | 1/1999 |

* cited by examiner

*Primary Examiner*—Stephen D'Agosta
(74) *Attorney, Agent, or Firm*—Philip Wadsworth; Charles D. Brown; Howard H. Seo

(57) ABSTRACT

An apparatus for providing a custom profile in a wireless device, and a method of modifying an audio profile in a wireless device, are disclosed. The apparatus includes a memory into which at least one criterion is entered by the user, a receiver that receives an audio signal, a comparator that receives the audio signal from the receiver, and that receives at least a first of the least one criterion from the memory, and that compares the audio signal to the first criterion, and an adjustor that adjusts the audio signal based on the result from the comparator. The method includes the steps of entering, by a user of the wireless device, of a first criterion, comparing an audio signal received by the wireless device to the first criterion, adjusting the audio signal based on the output of the comparing step, and playing the adjusted audio signal to the user, or broadcasting the adjusted audio signal to a remote caller.

14 Claims, 4 Drawing Sheets

PROVIDING CUSTOM AUDIO PROFILE IN WIRELESS DEVICE

BACKGROUND OF THE INVENTION

1. Field of the Invention

The present invention is directed generally to a method and apparatus for use in a wireless device and, more particularly, to a method and apparatus for providing a custom audio profile in a wireless device.

2. Description of the Background

A person garners elements of that person's self image from the identity and appearance that person feels he or she outwardly presents. An important factor in the identity and appearance a person presents is the way that person sounds. Due to intracranial resonance and other factors, a person rarely sounds, in actuality, the same as that person thinks he or she sounds. Thus, persons are not presenting outwardly the same identity and appearance they think they are, and, if alerted to that fact, persons may suffer damage to their respective self-images.

Much of this damage to self-image may stem from the way persons present themselves over the telephone. Due to the fact that a person cannot, by his or her expression or body language, convey emotion over the telephone, that person may sound passive, meek or, indifferent over the telephone, rather than sounding the way that person intended to sound.

Therefore, the need exists for a telephone that can support a person's self image by allowing that person to sound the way that person desires to sound, to convey the image and emotions that he wants to convey, while allowing him, if desired, to retain a certain level of recognizability, understandability, or clarity.

BRIEF SUMMARY OF THE INVENTION

The present invention is directed to an apparatus for providing a custom profile in a wireless device. The apparatus includes a memory into which at least one criterion is entered by the user, a receiver that receives an audio signal, a comparator that receives the audio signal from the receiver, and that receives at least a first of the least one criterion from the memory, and that compares the audio signal to the first criterion, and an adjustor that adjusts the audio signal based on the result from the comparator.

The present invention also includes a method of modifying an audio profile in a wireless device. The method includes the steps of entering, by a user of the wireless device, of a first criterion, comparing an audio signal received by the wireless device to the first criterion, adjusting the audio signal based on the output of the comparing step, and playing the adjusted audio signal to the user, or broadcasting the adjusted audio signal to a remote caller.

The present invention solves problems experienced with the prior art because it provides a telephone that can support a user's self image by allowing that person to sound the way that person desires to sound, and that helps the user convey certain emotions over the telephone, while allowing the user, if the user desires, to retain a certain level of recognizability, understandability, or clarity. Those and other advantages and benefits of the present invention will become apparent from the detailed description of the invention hereinbelow.

BRIEF DESCRIPTION OF THE SEVERAL VIEWS OF THE DRAWING

For the present invention to be clearly understood and readily practiced, the present invention will be described in conjunction with the following figures, wherein.

DETAILED DESCRIPTION OF THE INVENTION

It is to be understood that the figures and descriptions of the present invention have been simplified to illustrate elements that are relevant for a clear understanding of the present invention, while eliminating, for purposes of clarity, many other elements found in a typical wireless device. Those of ordinary skill in the art will recognize that other elements are desirable and/or required in order to implement the present invention. However, because such elements are well known in the art, and because they do not facilitate a better understanding of the present invention, a discussion of such elements is not provided herein.

Figure 1:
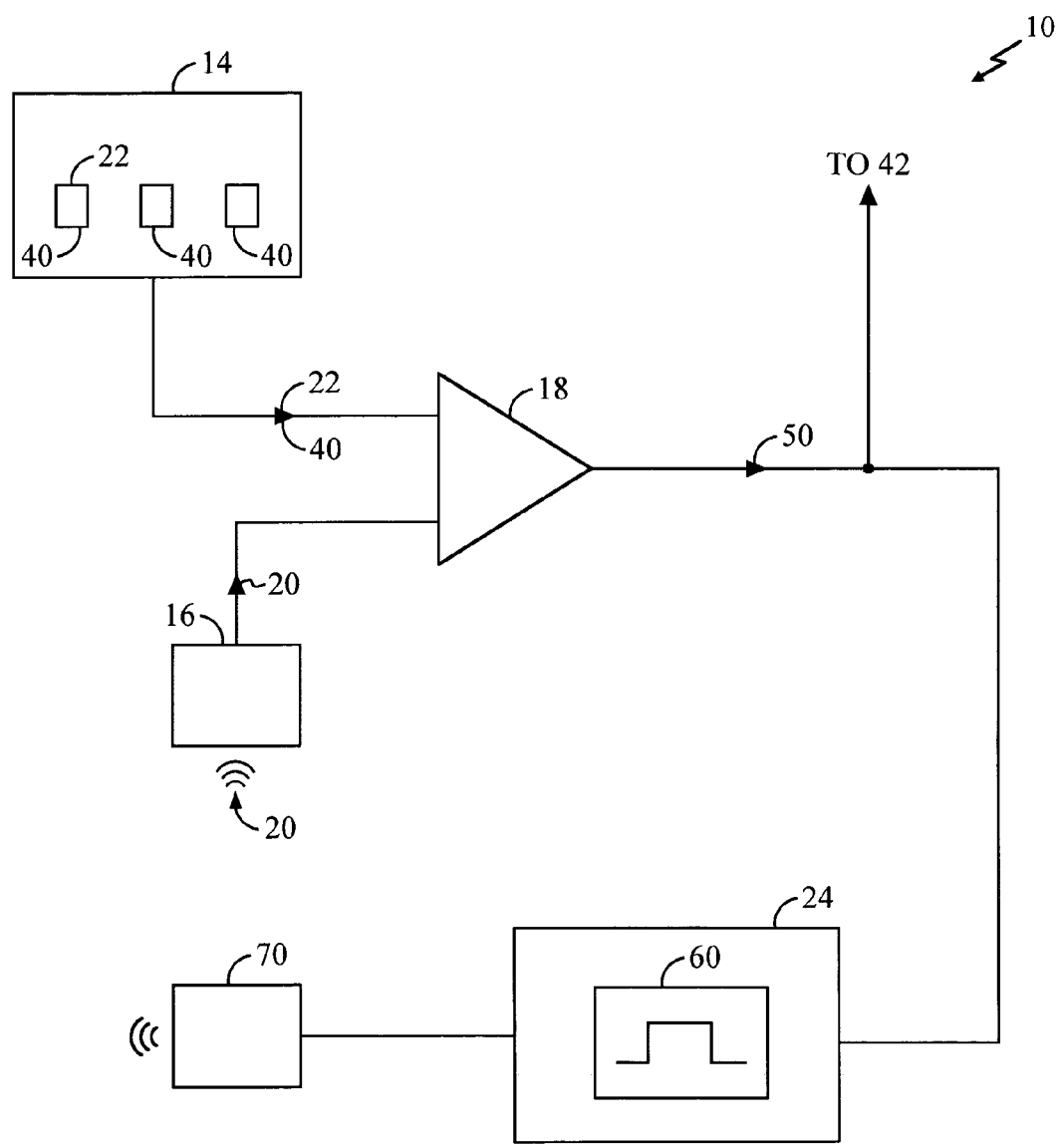
FIG. 1 is a schematic diagram illustrating an apparatus for providing a custom profile in a wireless device.
Figure 1A:
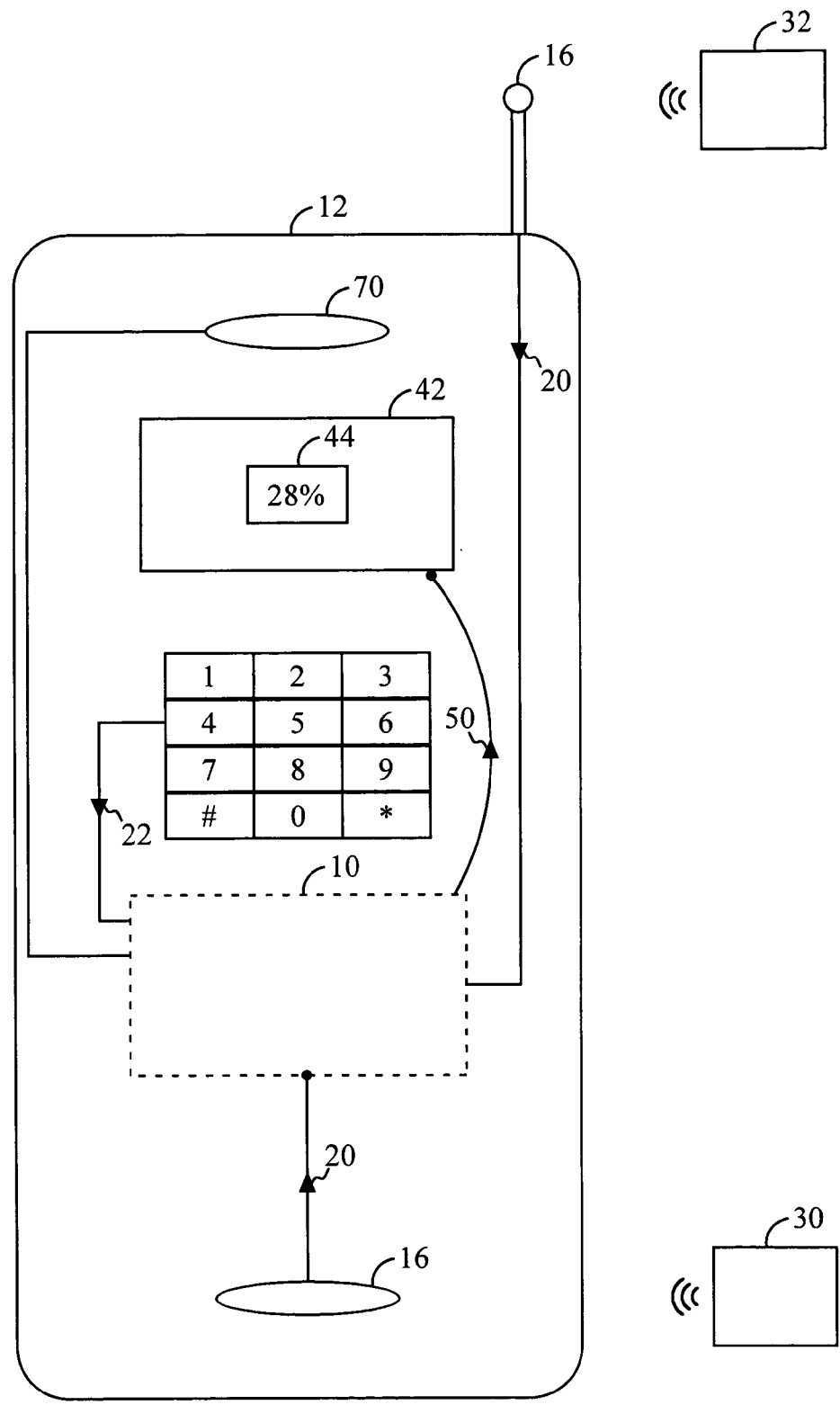
FIG. 1A is a schematic diagram illustrating an apparatus for providing a custom profile in a wireless telephone.

FIGS. 1 and 1A are schematic diagrams illustrating an apparatus 10 for providing a custom profile in a wireless device 12. The apparatus 10 includes a memory 14, a receiver 16, a comparator 18 that compares an audio signal 20 to a first criterion 22, and an adjustor 24 that adjusts the audio signal 20.

The memory 14 is included within the wireless device 12. The memory device 14 may be any device known in the art capable of storing a criterion, and capable of having that criterion read from the memory after storage. For example, in one embodiment, the memory 14 is a RAM. The user 30 of the wireless device 12, for example, enters at least one criterion 22 into the memory 14 of the wireless device 12. The at least one criterion 22 may also, in alternative embodiments, be entered into the wireless device 12 by a manufacturer of the wireless device 12, a programmer of the wireless device 12, a service provider for the wireless device 12, or a remote caller 32 to the wireless device 12. In the embodiment wherein the user 30 enters the at least one criterion 22, the at least one criterion 22 may be entered by the user 30 pressing a key to select an audio filter. For example, speech templates 40 may be available, with one speech template 40 corresponding to each of the numbers 1 through nine on a keypad of the wireless device 12. Alternatively, the at least one criterion 22 may be entered by the user 30 selecting a previously adjusted audio signal configuration.

The at least one criterion 22 is a value to which an audio signal 20 is compared in order to assess features of the audio signal 20. The at least one criterion 22 may be understandability of the audio signal 20, or clarity of the audio signal 20, or of components, such as frequency components, of the audio signal 20. The at least one criterion 22 may also be variance from a pre-determined value of the audio signal 20, or of a component of the audio signal 20, or may be recognizability of the audio signal 20. For example, the audio signal 20 may be a word spoken by the user 30 or by a remote caller 32. The understandability of the audio signal 20 would then be the factor or factors that contribute to the ability of a listener to make out the word spoken.

One component of understandability would be the size and distribution of the frequency peaks for pronunciation of certain sounds, such as vowels and consonants, for example. Consonants, for example, have peaks at higher frequencies than do vowels. Boosting the gain at higher frequencies leads to greater understandability, since even people with ordinary hearing do not hear higher frequencies as well as they hear lower frequencies. The hearing-impaired often are unable to hear significant quantities of high-frequency sound at all.

The clarity of the audio signal 20 would then be the factor or factors that contribute to the ease with which the listener can understand the audio signal 20, such as the ease with which the listener can hear the frequency that corresponds to the pronunciation of a consonant. The variance of the audio signal 20 would then be the factor or factors that contribute to the difference of the audio signal 20 from the normal value of such an audio signal 20. The pre-determined normal value may be, for example, a normal audio signal 20 for a particular speaker, or a normal range of audio signals 20 for a person, an animal, and so on. In such an instance, the user 30 might want to vary from the normal signal 20, such as to add flair to the user's voice, but not reach the point of no longer being recognizable as that user 30. Alternatively, the at least one criterion 22 may be a value specific to each of various users 30, or to one user 30, such as compensation for a hearing deficiency of the user 30, or specific to each of various remote callers 32, or to one remote caller 32, such as compensation for a hearing deficiency of the remote caller.

In another preferred embodiment, the first criterion 22 is a voice profile template 40. The voice profile template 40 may be that of a user 30, or that of a remote caller 32 to the wireless device 12. The voice profile 40 may be a voice template having characteristics that the user 30 desires the audio signal 20 to have. Due to intracranial echoing and interference, a user's voice often does not sound as the user 30 desires. Rather, the user 30 could desire the user 30, or the remote caller 32, to sound like a third party, such as a mother-in law, or a fictional character. For example, the voice profile template 40 may be John Wayne, or Bugs Bunny. Additionally, various subjective criteria may be provided, such as the user 30 desiring to sound unassuming or authoritative, and these subjective criteria, or any additional criteria, may be provided by the manufacturer and stored within the wireless device 12, or may be iteratively provided by the user 30 through the series of playbacks and adjustments provided for hereinbelow.

The receiver 16 receives the audio signal 20. The audio signal 20 may be incoming or outgoing, and thus the receiver 16 is herein defined as any device that receives incoming or outgoing audio signals 20 to or from the wireless device 12. Thus, for example, the receiver 16 may be a standard telephone mouthpiece, and the hardware that corresponds thereto, for sending audio signals 20 from the user 30, or an antenna of the wireless device 12, for receiving audio signals 30 sent from the remote caller 32. If the signal is incoming, a plurality of first voice profile templates (identity templates) can be compared against the signal to determine the identity of the speaker. Once the speaker has been identified, any of a second plurality of templates can be used to modify the voice, depending on the identity of the speaker or any other desired factor or factors.

The comparator 18 receives the audio signal 20 from the receiver 16, and receives at least one criterion 22 from the memory 14. The comparator 18 compares the audio signal 20 to the first criterion 22, and outputs at least one result 50 from the comparison. The comparator 18 is any device known in the art that compares two quantities and outputs a result of the comparison. In one embodiment, the comparator 18 is a signal processor, such as a DSP. An output display 42 is preferably provided in the wireless device 12, and that output display 42 may provide feedback 44 to the user 30 of the at least one result 50 from the comparator 18.

The adjustor 24 adjusts the audio signal 20 based on the result 50 of the comparator 18. In a preferred embodiment, the adjustor 24 is automated. In an alternative embodiment, the user 30 of the wireless device 12 may control the adjustor 24. The adjustor 24 may be any device known in the art that responds to an output 50 of a comparator 18, and adjusts an audio signal 20 for broadcast based on the result 50 of the comparison 18, such as a signal processor. The adjustor 24 may include a filtering combination 60 or filtering system that adjusts the voice characteristics of the user 30, or of the remote caller 32, to match the at least one criterion 22. One filter may be provided, as is known in the art, for each audio signal 20, or numerous filters may be provided, and a single filter may then correspond to only a component, such as a frequency component, of the audio signal 20.

In operation, the user may enter a first criterion 22 that is at least one stored recognition template 40. The stored recognition template 40 is a set of pre-determined voice characteristics. The audio signal 20 is then compared to the stored recognition template 40, and the result 50 from the comparator 18 may then cause the adjustor 24 to run the audio signal 20 through free-form voice modification filtering 60 to heighten understandability or reduce variance from the at least one stored recognition template 40.

In another preferred embodiment, the stored recognition template 40 may be a user desired speech profile, i.e., what the user 30 desires to sound like, or what the user 30 desires the remote caller 32 to sound like. Each stored recognition template 40 may correspond to a key pressable by the user 30 of the wireless device 12. The result 50 of the comparator 18 is a percent variance of the audio signal 20 from the stored recognition template 40. This percent variance may then be assigned a single word rating, based on the one word spoken by the user 30 as the audio signal 20, or based on one word received from the remote caller 32 at the wireless device. Alternatively, several words or phrases may be received as the audio signal 20, and the comparator 18 may generate a plurality of percent variances for the plurality of audio signals 20. This plurality of percent variances then forms a multi-word rating, which multi-word rating may be a cumulative rating, or an averaged rating of the single word ratings corresponding to each of the plurality of percent variances. The percent variance measurement is preferably a statistical comparison of voice characteristics in the audio signal 20 and of the first criterion 22. The voice characteristics compared may be, but are not limited to, the frequency content of the audio signal 20 and the frequency location of the audio signal 20.

The apparatus 10 for providing a custom profile in a wireless device 12 preferably also includes an audio player 70 that plays back the audio signal 20 after the audio signal 20 is received, and again after the audio signal 20 is adjusted. The audio player 70 may play the audio signal from a remote caller 32 to the user 30 after the audio signal 20 is adjusted, or may play back the audio signal 20 from the user 30 after adjustment of the audio signal 20.

Figure 2:
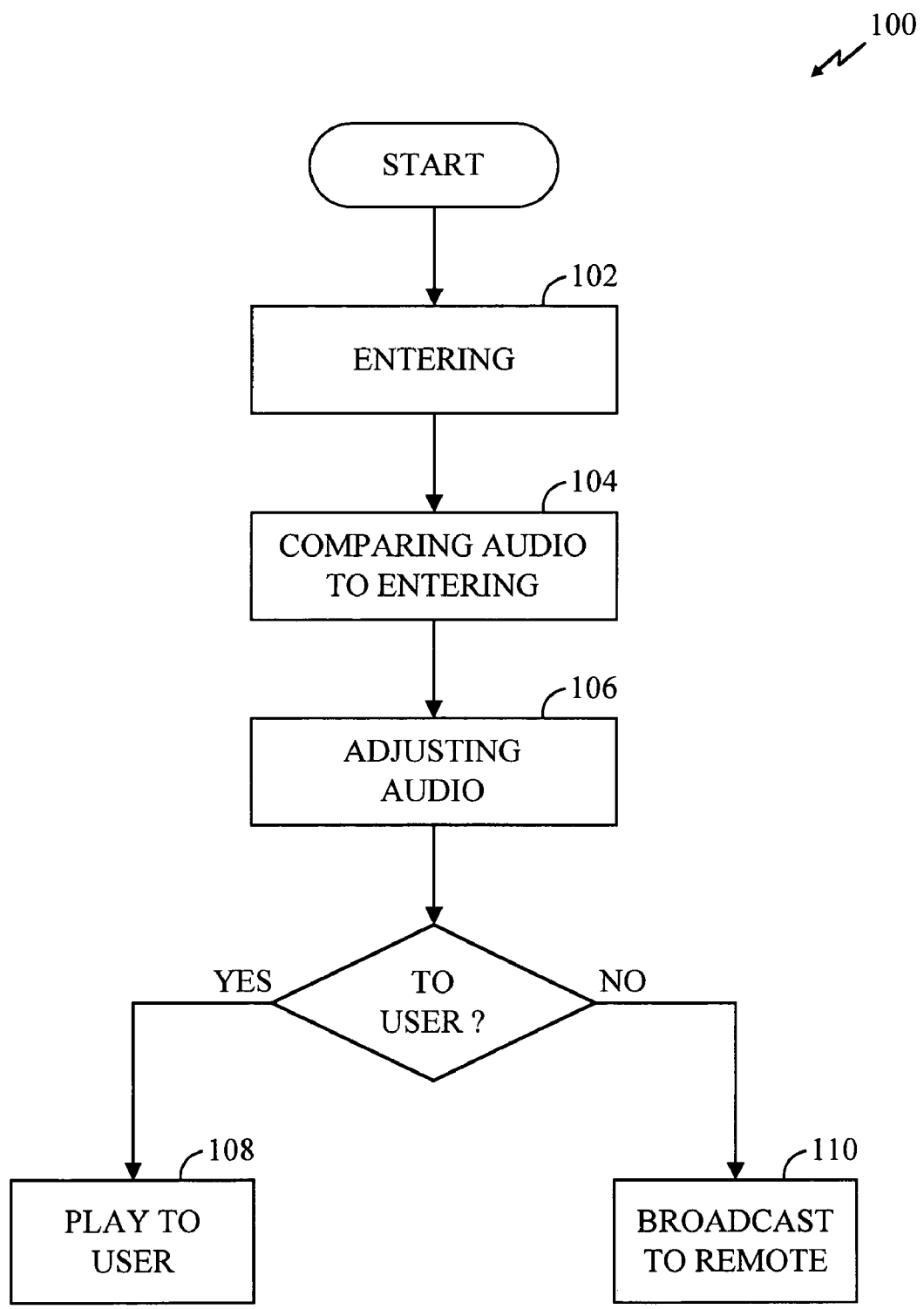
FIG. 2 is a flow diagram illustrating the method of modifying an audio profile in a wireless device.

FIG. 2 is a flow diagram illustrating the method 100 of modifying an audio profile in a wireless device of the present invention. The method includes the step 102 of entering, by a user of the wireless device, of a first criterion, the step 104 of comparing an audio signal received by the wireless device to the first criterion, the step 106 of adjusting the audio signal based on the comparison, and the step 108 of playing the adjusted audio signal to the user, or the step 110 of broadcasting the adjusted audio signal to a remote caller.

A user of the wireless device performs the step 102 of entering a first criterion. The first criterion may be, for example, understandability, clarity, variance from a predetermined normal value, recognizability, substantially as discussed hereinabove with respect to FIG. 1. The entering step 102 may be performed by the user pressing a key to select a pre-stored comparative template as the first criterion, for example.

The step 104 of comparing an audio signal received by the wireless device to the first criterion may be performed, for example, by a signal processor. The comparing step 104 generates at least one result of the comparison. The comparing step 104 may include, for example, evaluating the audio signal against at least one stored recognition template. The stored recognition template may be a user desired speech profile. Numerous stored recognition templates may be stored on the wireless device, and each stored recognition template may, for example, correspond to a key on a keypad of the wireless device. The user would then select the desired template before the comparing step 104.

The evaluating may be a running of the audio signal through free-form voice modification filtering to heighten understandability and reduce variance from the at least one stored recognition template. For example, the user may desire that his or her boss sound like a duck. The comparing step 104 would thus run the incoming audio signal of the boss's voice through a voice modifier to assess what filtering would best reduce the variance between the boss's actual voice audio signal and a duck. Thus, in this instance, the evaluating of the comparing step 104 might include statistically comparing to, and assigning a percent variance of the audio signal from, the stored recognition template of a duck. The percent variance is then preferably assigned a single word rating.

This evaluating may be repeated for a plurality of audio signals. In the embodiment wherein the evaluating is repeated for numerous audio signals, a plurality of percent variances may be generated, leading to a multi-word rating. This multi-word rating may be a cumulative rating for all words that are statistically compared, or may be an averaged rating of the single word ratings corresponding to each of the plurality of percent variances. More specifically, the percent variance may be calculated by statistically comparing voice characteristics, such as frequency content and frequency location.

The step 106 of adjusting the audio signal is performed based on the result of the step 104 of comparing. In the above example, the step 106 of adjusting would include the adjustment, through filtering, of the audio signal to form the audio signal into that of a duck. The filtering of the adjusting step 106 may include boosting a particular frequency of the audio signal. The adjusting step 106 is preferably performed automatically by the wireless device, but may be responsive to an input from the user of the wireless device, wherein the input from the user is based on at least one result of the comparing step. The at least one result may be provided to the user as feedback displayed, for example, as an icon on a display screen of the wireless device. The step 106 of adjusting may include such adjustments as boosting particular frequencies in order to improve the clarity of at least one consonant, vowel, or other sound pronunciation, or to compensate for a hearing deficiency of the user or of the remote caller.

Finally, the step 108 of playing the adjusted audio signal to the user after adjustment of the audio signal, or the step 110 of broadcasting the adjusted audio signal to a remote caller, is performed. In a preferred embodiment, the playback to the user is performed after a delay following the receipt of the audio signal from the user in the form of the user speaking, to prevent interference and sound interaction, such as intracranial interference, for example. Also in a preferred embodiment, the delay is preferably minimized between the receipt of the audio signal from the remote caller and the playback to the user, thereby allowing real-time conversation on the wireless device.

Figure 3:
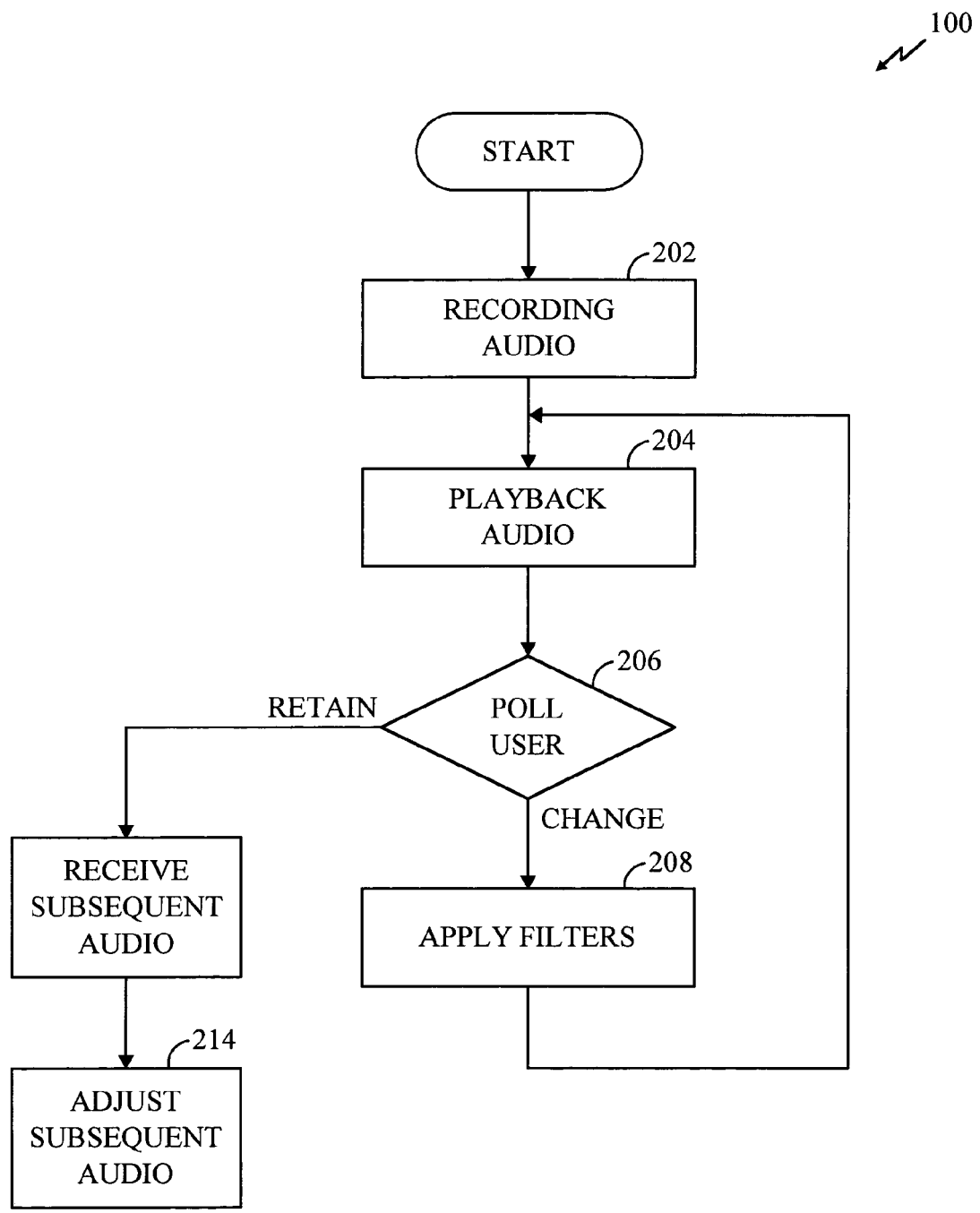
FIG. 3 is a flow diagram illustrating more particularly one embodiment of the method of FIG. 2.

FIG. 3 is a flow diagram illustrating more particularly one embodiment of the method 100 of FIG. 2. The method 100 includes the step 202 of recording an audio signal, the step 204 of playing back the audio signal to a user of the wireless device, the step 206 of polling the user to selectively apply filtering to the played back audio signal, the step 208 of filtering the audio signal according to step of polling of the user, the step of playing back the filtered audio signal to the user, the repeating of the polling, filtering, and playing back steps until the user elects, upon the polling, to retain a then current filtering configuration, which then current filtering configuration becomes the audio profile, and the step 214 of applying the audio profile to a subsequent audio signal.

During the polling step 206, the user may elect to selectively apply filtering by pressing a numbered key on the wireless device. The numbered key preferably corresponds to a pre-stored speech template. The filtering step 208 then includes the filtering selected by the user during the polling step.

The audio signal of FIG. 3 may be an incoming audio signal to the wireless device from a remote caller, or an outgoing audio signal from the wireless device to a remote caller. The subsequent audio signal may be an outgoing audio signal from the wireless device to a remote caller, or an incoming audio signal to the wireless device from a remote caller.

Those of ordinary skill in the art will recognize that many modifications and variations of the present invention may be implemented. The foregoing description and the following claims are intended to cover all such modifications and variations.

What is claimed is:

1. An apparatus for providing a custom profile in a wireless device, comprising:
   a memory into which at least one criterion is entered by a user of the wireless device;
   a receiver that receives an audio signal;
   a comparator that receives the audio signal from said receiver, and that receives at least a first of the least one criterion from said memory, wherein said comparator compares the audio signal to the first criterion, and wherein said comparator outputs at least one result of the comparison; and
   an adjustor that adjusts the audio signal based on the result of said comparator, wherein the first criterion is at least one stored recognition template and, wherein the result is a percent variance of the audio signal from the stored recognition template.

2. The apparatus of claim 1, wherein the percent variance is assigned a single word rating.

3. The apparatus of claim 1, wherein the comparator generates a plurality of percent variances for a plurality of audio signals, which plurality of percent variances forms a multi-word rating.

4. The apparatus of claim 3, wherein the multi-word rating is a cumulative rating.

5. The apparatus of claim 3, wherein the multi-word rating is an averaged rating of the single word ratings corresponding to each of the plurality of percent variances.

6. The apparatus of claim 1, wherein the percent variance is a statistical comparison of voice characteristics in the audio signal and of the first criterion.

7. The apparatus of claim 6, wherein the voice characteristics are at least one selected from the group consisting of frequency content and frequency location.

8. The apparatus of claim 1 wherein each stored recognition template corresponds to a key on a keypad of the wireless device.

9. A method of modifying an audio profile in a wireless device, comprising the steps of:
   entering, by a user of the wireless device, of a first criterion;
   comparing an audio signal received by the wireless device to the first criterion;
   adjusting the audio signal based on said comparing; and
   playing the adjusted audio signal to the user, or broadcasting the ajusted audio signal to a remote caller.
   wherein said adjusting is responsive to an input from the user of the wireless device, and wherein the input from the user is based on at least one result of said comparing, wherein said comparing comprises evaluating the audio signal against at least one stored recognition template and wherein said evaluating comprises statistically comparing, and assigning a percent variance of the audio signal from the stored recognition template, and wherein the percent variance is assigned a single word rating.

10. A method of modifying an audio profile in a wireless device, comprising the steps of:
    entering, by a user of the wireless device, of a first criterion;
    comparing an audio signal received by the wireless device to the first criterion;
    adjusting the audio signal based on said comparing; and
    playing the adjusted audio signal to the user, or broadcasting the adjusted audio signal to a remote caller,
    wherein said adjusting is responsive to an input from the user of the wireless device, and
    wherein the input from the user is based on at least one result of said comparing, wherein said comparing comprises evaluating the audio signal against at least one stored recognition template and wherein said evaluating comprises statistically comparing, and assigning a percent variance of the audio signal from the stored recognition template, and wherein said evaluating is repeated for a plurality of audio signals, thereby assigning a plurality of percent variances, which plurality of percent variances forms a multi-word rating.

11. The method of claim 10, wherein the multi-word rating is a cumulative rating.

12. The method of claim 10, wherein the multi-word rating is an averaged rating of the single word ratings corresponding to each of the plurality of percent variances.

13. The method of claim 9, wherein the percent variance is calculated by statistically comparing voice characteristics.

14. The method of claim 13, wherein the voice characteristics are at least one selected from the group consisting of frequency content and frequency location.

* * * * *